(12) United States Patent
Schimpf et al.

(10) Patent No.: US 8,659,821 B2
(45) Date of Patent: Feb. 25, 2014

(54) DEVICE FOR AMPLIFYING LIGHT PULSES

(75) Inventors: Damian Schimpf, Cambridge, MA (US); Jens Limpert, Jena (DE); Andreas Tuennermann, Weimar (DE)

(73) Assignees: Fraunhofer-Gesellschaft zur Foerderung der angewandten Forschung e. V., Munich (DE); Friedrich-Schiller-Universitaet Jena, Jena (DE)

( * ) Notice: Subject to any disclaimer, the term of this patent is extended or adjusted under 35 U.S.C. 154(b) by 119 days.

(21) Appl. No.: 12/998,040

(22) PCT Filed: Sep. 11, 2009

(86) PCT No.: PCT/EP2009/006595
§ 371 (c)(1),
(2), (4) Date: Jun. 20, 2011

(87) PCT Pub. No.: WO2010/028837
PCT Pub. Date: Mar. 18, 2010

(65) Prior Publication Data
US 2011/0242646 A1  Oct. 6, 2011

(30) Foreign Application Priority Data

Sep. 12, 2008 (DE) .......................... 10 2008 047 226

(51) Int. Cl.
*H01S 3/10* (2006.01)
(52) U.S. Cl.
USPC ....................................... 359/337; 359/337.5
(58) Field of Classification Search
USPC ................................ 359/337, 337.5; 398/160
See application file for complete search history.

(56) References Cited

U.S. PATENT DOCUMENTS

| | | | |
|---|---|---|---|
| 5,499,134 A * | 3/1996 | Galvanauskas et al. | 359/333 |
| 7,414,780 B2 * | 8/2008 | Fermann et al. | 359/337 |
| 8,031,396 B2 * | 10/2011 | Fermann et al. | 359/341.5 |
| 8,228,597 B2 * | 7/2012 | Fermann et al. | 359/333 |
| 2004/0000942 A1 | 1/2004 | Kapteyn et al. | |

FOREIGN PATENT DOCUMENTS

| | | |
|---|---|---|
| DE | 195 31 059 | 2/1996 |
| WO | WO 03/055015 | 7/2003 |
| WO | WO 2007/008615 | 1/2007 |

OTHER PUBLICATIONS

International Search Report.

(Continued)

*Primary Examiner* — Mark Hellner
(74) *Attorney, Agent, or Firm* — Colland & Roe, P.C.

(57) ABSTRACT

The present invention relates to a device (1, 11) for amplifying light pulses (2, 12), the device comprised of a stretcher (4, 14) which temporally stretches the light pulses (2, 12), and comprised of at least one amplifier (5, 15) which amplifies the stretched light pulses (2, 12), and comprised of a compressor (6, 16) which recompresses the stretched and amplified light pulses (2, 12), the stretcher (4, 14) and the compressor (6, 16) being dispersive elements with essentially oppositely identical dispersion. To provide a device (1, 11) for amplifying light pulses (2, 12) which is of a compact setup and which can be flexibly applied, the present invention proposes that the dispersion of the amplifier (5, 15), the dispersion of further optical elements of the device (1) and/or a mismatch of dispersion of the stretcher (4, 14) and compressor (6, 16) are at least partly compensated by self-phase modulation of the light pulses (2, 12) and/or by at least one additional element (17) of variable dispersion.

11 Claims, 3 Drawing Sheets

(56) References Cited

OTHER PUBLICATIONS

Figure 1:
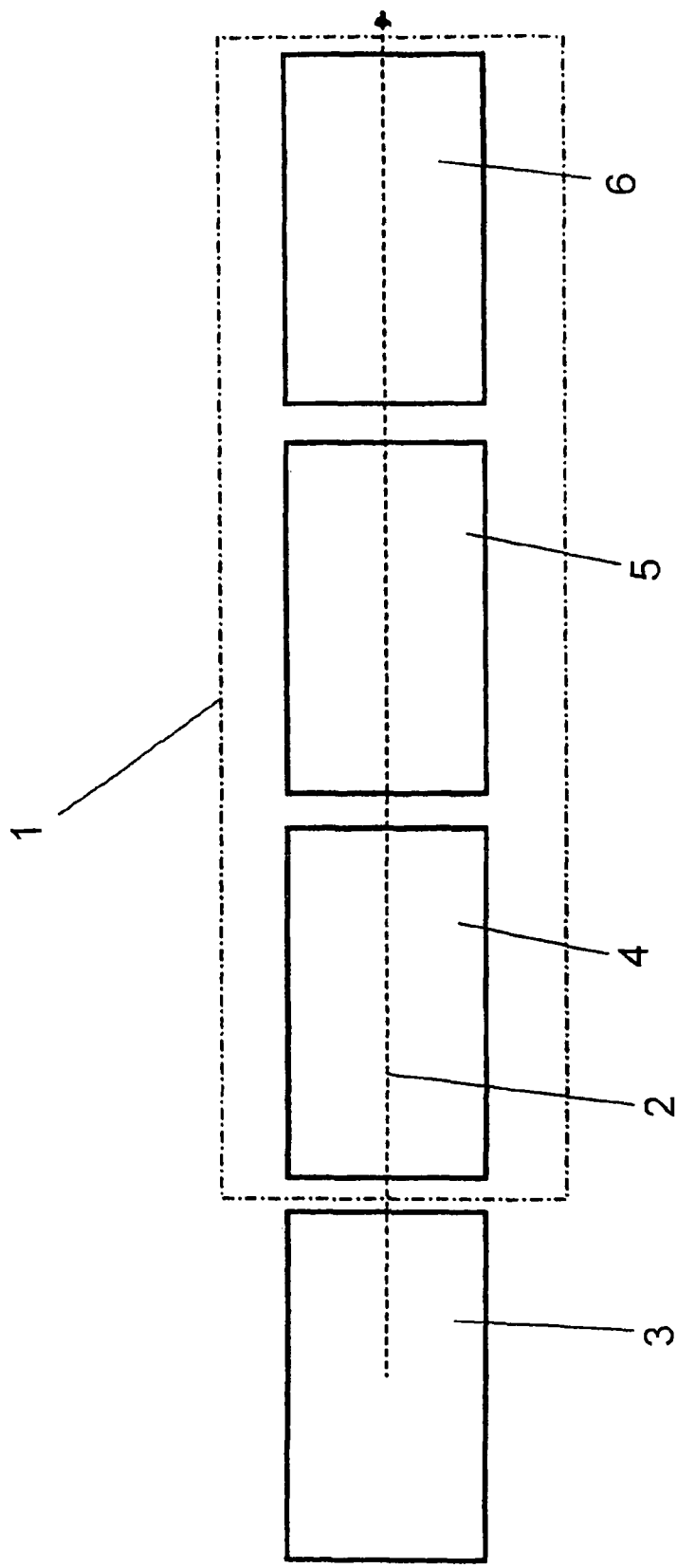

Tournois, P: "Acousto-optic programmable dispersive filter for adaptive compensation of group delay time dispersion in laser systems." Optics Communications, North-Holland Publishing Co. Amsterdam, NL. vol. 140, No. 4-6. Aug. 1, 1997, pp. 245-249, XP004082630. ISSN: 0030-4018. (ISR).

* cited by examiner

DEVICE FOR AMPLIFYING LIGHT PULSES

CROSS REFERENCE TO RELATED APPLICATIONS

This application is the National Stage of PCT/EP2009/006595 filed on Sep. 11, 2009, which claims priority under 35 U.S.C. §119 of German Application No. 10 2008 047 226.3 filed on Sep. 12, 2008, the disclosure of which is incorporated by reference. The international application under PCT article 21(2) was not published in English.

The invention relates to a device for amplifying light pulses, said device comprised of a stretcher which temporally stretches the light pulses, at least one amplifier which amplifies the stretched light pulses, and a compressor which recompresses the stretched and amplified light pulses, said stretcher and compressor being dispersive elements with essentially oppositely identical dispersion. The invention furthermore relates to a method for amplifying light pulses.

Devices of this kind are known from prior art and are applied in generating high-energy laser pulses, for example. Accordingly, in most cases ultrashort light pulses having a pulse duration in the range of picoseconds or femtoseconds are amplified up into the petawatt range. To avoid damage to optical elements as well as to avoid limitations due to nonlinear effects, the ultrashort light pulses are initially conducted through a stretcher which temporally stretches the light pulses by way of dispersion. The light pulses thus obtain a longer pulse duration and a lower amplitude. Light pulses stretched in terms of time are subsequently amplified by an amplifier, for example by an optically pumped amplifier fiber, without this causing any damage to the optical elements of the amplifier or any undesired non-linearities. Temporally stretched and amplified light pulses are subsequently recompressed by a compressor, which is again done by means of dispersion. Accordingly, the light pulses obtain the desired high intensity and short pulse duration.

The amplification principle described hereinabove is also designated as chirp-modulated pulse amplification (CPA—Chirped Pulse Amplification). In CPA systems, it is well known to impress a positive chirp onto the initially ultrashort light pulse by means of a stretcher which is configured as an element of normal dispersion. Upon amplification, this is compensated by the compressor which is accordingly configured as an element of abnormal dispersion. Conventional elements for generating a positive chirp, for example, are grating stretchers (e.g. opener type), wherein the positive chirp is compensated after amplification of the light pulse by a grating compressor comprised of a suitable grating pair.

The drawbacks associated with such CPA systems are the dimensions and adjustment susceptibility of the grating arrangements, wherein the dimensions of the grating stretcher in most cases are greater than those of the grating compressor. To solve these problems, it has been proposed, for example, to utilize fiber stretcher grating compressor CPA systems in which, however, non-compensated dispersion terms of a higher order of magnitude may adversely affect the quality of recompressed light pulses. It is furthermore known that an improvement of the compactness as well as adjustment sensitivity of a CPA system can be achieved by utilizing chirped volume Bragg gratings (VBG) to stretch and compress the light pulses.

For example, a conventional CPA system is known from the published patent application DE 195 31 059 A1 wherein both the stretcher and the compressor are configured as chirped Bragg gratings and have essentially oppositely identical dispersion. Arranged between the stretcher and compressor is an amplifier by means of which the temporally stretched light pulses are amplified. Furthermore, a dispersion compensation device is provided for which can compensate the dispersion of the amplifier, any other optical components of the system as well as a dispersion mismatch, if any, of the stretcher and compressor. For example, with the prior art system, a waveguide structure or an optical fiber with a positive or a negative dispersion may serve as dispersion compensation device.

A drawback in conventional devices for amplifying light pulses lies in that these devices in most cases have a static and little compact structure so that such devices are not easy to adapt to their relevant intended application and are therefore not very flexibly usable.

Now, therefore, it is the object of the present invention to provide an improved device for amplification of light pulses.

This task is inventively solved by a device of the initially designated kind which is characterized in that the dispersion of the at least one amplifier, the dispersion of further optical elements of the device and/or a mismatch of dispersion of the stretcher and compressor are at least partly compensated by self-phase modulation of the light pulses and/or by at least one additional element of variable dispersion.

With the inventive device, the dispersion generated in a CPA system by optical elements of an amplifier, the dispersion of other optical elements of the system and/or a mismatch of dispersion of the stretcher and compressor can be variably and exactly compensated, with it being possible to selectively use the nonlinear self-phase modulation of light pulses on the one hand and at least one additional element of variable dispersion on the other hand or a combination of these measures for this purpose. Passive filters, isolators, filters, modulators and the like can be used, for example, as further optical elements of the device and/or of a CPA system.

The mismatch of dispersion of the stretcher and compressor results from the influence of the dispersion of the optical elements of the amplifier and from the dispersion of further optical elements of the device. Moreover, a performance-dependent mismatch caused by non-linearities in the form of self-phase modulation is also to be taken into account. Since these influences are performance-dependent and continually variable, an appropriate adaptation of the dispersion of the compressor not only to the dispersion of the stretcher but also to these further non-linearities must be realized to achieve ideal recompression of the light pulses. If such an adaptation is not realized or realized only imprecisely, a corresponding mismatch is generated which is to be compensated in order to achieve optimal light pulses with regard to pulse duration and amplitude. The dispersion of the amplifier and/or further optical elements of the device causes a non-ideal recompression of light pulses, even with a stretcher and compressor that are optimally harmonized with each other. In accordance with the present invention, a possibly ideal compensation of the dispersion terms occurring in the device is achieved in a simple manner by means of self-phase modulation and/or by means of at least one additional element of variable dispersion.

The phase impressed by the optical elements of the amplifier and/or the further optical elements of the device as well as the performance-dependent nonlinear phase impressed by self-phase modulation typically is clearly smaller than the phase which in terms of its amount is impressed by the mismatch of the overall system. To compensate the latter phase optimally, the at least one additional element of variable dispersion can be utilized according to the present invention. For example, a very compact grating compressor comprised of two diffraction gratings with a variable distance to each other can serve as additional element of variable dispersion.

The question whether merely the self-phase modulation or the at least one additional element of variable dispersion or a combination of these measures is utilized for compensation of undesired dispersion terms depends on the relevant intended purpose and application of the device.

On the whole, it becomes evident already here that the inventive device can be adapted in a highly variable manner to different applications which can be realized in a simple way without exchanging all construction elements of the device.

In accordance with an advantageous embodiment of the present invention, the dispersive elements of the stretcher and/or compressor have a static or a gradually variable dispersion, wherein the at least one additional element of variable dispersion has an infinitely variable dispersion. Concerning the dispersion, the stretcher and/or compressor can for example be varied stepwise. At the different stages of adjustment, a mismatch between stretcher and compressor can be compensated by means of the at least one additional element of variable dispersion. This can be realized very variably and exactly, because the at least one additional element of variable dispersion features an infinitely variable dispersion.

Another advantageous embodiment of the present invention provides for that the dispersive elements of the stretcher and/or compressor are diffraction gratings, chirped fiber-optical or volume-optical Bragg gratings, prisms or waveguide structures such as optical fibers. The use of chirped volume Bragg gratings, in particular, offers a very compact set-up and structure of the device.

In accordance with another advantageous embodiment of the present invention, the at least one additional element of variable dispersion comprises an adjustable prism pair or diffracting grating pair. This configuration of the additional element of variable dispersion, too, leads to a very compact configuration of the entire device. By varying the distances of the applied prisms or diffraction gratings to each other, the dispersion of the additional element of variable dispersion can be adjusted infinitely variable in order to be able to compensate a dispersion generated by further components of the device always as exactly as possible. Furthermore, depending on requirements, the additional element of variable dispersion may feature an acousto-optical tunable filter or a liquid crystal modulator.

It is furthermore proposed that the dispersion of the at least one additional element of variable dispersion is smaller in amount than the dispersion of the stretcher or compensator. Since the additional element only serves for compensation of mismatches, its dispersion can be substantially smaller in amount than that of the stretcher and/or compressor. It means the additional element of variable dispersion can be of a much more compact configuration in relation to the stretcher and compressor, which takes a positive effect on the compactness of the entire device.

According to an advantageous embodiment of the present invention, the light pulses have a parabolic pulse shape, a $sech^2$ shape or a Gaussian shape, the choice of a parabolic pulse shape ensuring an exact compensation of the dispersion of the $2^{nd}$ order of magnitude. However, the alternative pulse shapes also lead to good dispersion compensation.

It is expedient to arrange the at least one additional element of variable dispersion upstream to the stretcher or between the stretcher and the amplifier. For example, phase terms caused by optical elements of the amplifier and/or of the further optical elements of the device can already be influenced hereby in such a manner that the dispersion of the optical elements of the entire device on the whole is optimally compensated. The additional element of variable dispersion is thus implemented upstream to the amplifier, i.e. in a range of the beam path of the light pulses in which the light pulses feature low amplitude. A large-volume structure and set-up of the additional element of variable dispersion or even a cooling are therefore not required. Hence, the additional element can advantageously be configured so as to be very small and compact.

Furthermore, it is proposed that the energy and the duration of the light pulses as well as the amplification of the light pulses are so tuned to each other that the dispersion of the amplifier, the dispersion of the further optical elements of the device and/or the mismatch of the dispersion of the stretcher and compressor are essentially completely compensated for by self-phase modulation of the light pulses. This corresponds to the afore-mentioned adjustment of a working point of the device to generate light pulses with optimal properties with regard to pulse duration and pulse amplitude.

On the whole, it remains to be highlighted that the present invention proposes a device for amplification of light pulses which is of a very compact configuration and which at the same time can be applied and utilized with high variability. For this purpose, the most different combinations of the afore-mentioned characteristic features are possible.

The invention furthermore proposes a method for amplifying light pulses by application of a suitable device, wherein the light pulses from a light source are temporally stretched, and wherein by means of at least one amplifier the stretched light pulses are amplified and wherein by means of a compressor the stretched and amplified light pulses are recompressed, said stretcher and compressor being dispersive elements with essentially oppositely identical dispersion. The method is inventively characterized in that the dispersion of the amplifier, the dispersion of further optical elements of the device and/or a mismatch of dispersion of the stretcher and compressor are at least partly compensated by self-phase modulation of the light pulses and/or by at least one additional element of variable dispersion. The fact that the stretcher and the compressor are dispersive elements with essentially oppositely identical dispersion, for example, may imply that the dispersions of the stretcher and compressor are of a similar amount, but have opposite signs.

Figure 2:
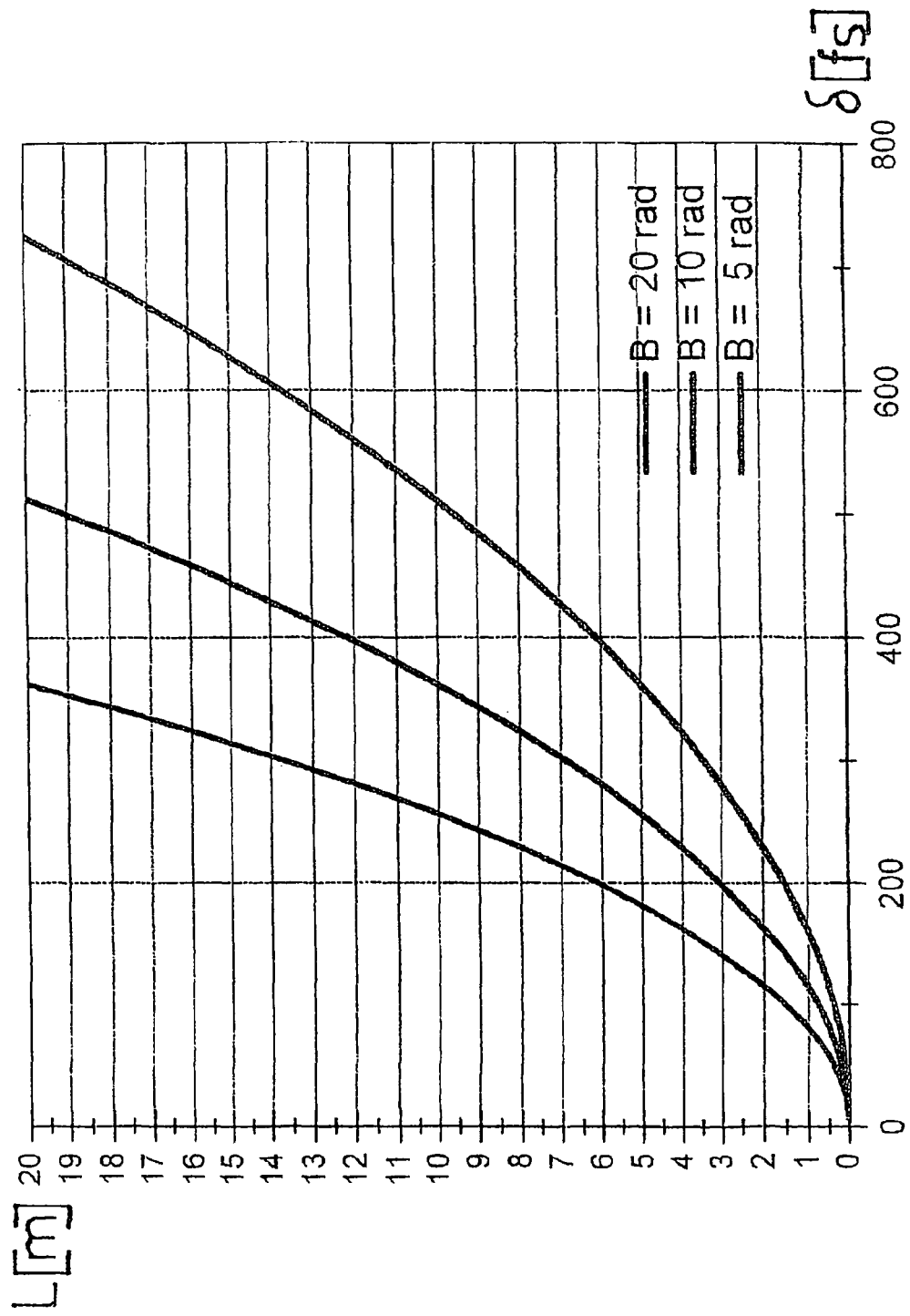

Further advantages and features of the present invention are elucidated in the following by way of examples of embodiments shown in the relevant figures, wherein:

FIG. 1: shows a schematic view of a practical example of the inventive device,

FIG. 2: Shows a diagram to elucidate the dispersion compensation by means of self-phase modulation according to the invention, and FIG. 3: shows a schematic view of another practical example of the inventive device.

FIG. 1 shows an embodiment of the inventive device 1 for amplifying of light pulses 2. Light pulses 2 are generated by a short pulse source 3, e.g. a short pulse oscillator or an already amplified short pulse oscillator, and subsequently temporally stretched by stretcher 4. Next to the temporal stretching of light pulses 2, these pulses are amplified by means of the at least one amplifier 5 or alternatively by several amplifiers 5 in the form of an amplifier chain. Having amplified the light pulses 2, these are temporally recompressed by compressor 6 so that ultimately short light pulses of high intensity are made available. The overall set-up and structure shown in FIG. 1 essentially corresponds to a CPA system. With this CPA system and/or with the embodiment of the inventive device 1 shown here, the dispersion of the amplifier 5, the dispersion of other not shown optical elements of the device (1) and/or a mismatch of the dispersion of stretcher 4 and compressor 6 according to the present invention are compensated for solely by self-phase modulation. There is no need for other constructive elements so that on the whole a device 1 of a very simple and compact set-up and structure is given. By selecting a suitable working point with regard to pulse amplitude and pulse duration, the device 1 can be adjusted in a simple manner so that a possibly ideal compensation of undesired dispersion terms is accomplished.

The schematic representation of FIG. 1 should also be understood to imply that for example the stretcher 4 and/or compressor 6 are utilized as elements in reflection and are configured for example as chirped Bragg gratings to serve this purpose. Such a configuration of device 1 would naturally generate a curve of the beam of light pulses 2 that deviates from the one shown in FIG. 1 which nevertheless should be covered by the schematic representation of FIG. 1. In addition, the stretcher 4 and compressor 6 are configured as one and the same element, which for example is configured as a chirped Bragg grating. Provision may also be made for using several amplifiers 5 in the form of an amplifier chain instead of one amplifier 5 in order to obtain the desired amplification.

An optimal dispersion compensation is achieved if the spectral phase shifts of the light pulses which are generated by the stretcher, compressor, amplifier elements and by the self-phase modulation (SPM) occurring in the amplifier cancel out each other which can be mathematically expressed as follows:

$$\Delta\varphi_{total} = \varphi_{stretcher} + \varphi_{compressor} + \varphi_{amplifier\ elements} + \varphi_{SPM} = 0$$

Upon series expansion of this equation and concentrating on the dispersion terms of the $2^{nd}$ order of magnitude, it results the following:

$$\Delta\varphi_{total} = \frac{\varphi''_{stretcher}}{2}\Omega^2 + \frac{\varphi''_{compressor}}{2}\Omega^2 + \frac{\varphi''_{amplifier\ elements}}{2}\Omega^2 + \varphi_{SPM} = 0$$

Here, $\varphi''$ is the second derivation of spectral phase generated by the relevant element, and $\Omega$ represents the deviation of the frequency from the central frequency of the light pulses. In case of the smallest deviations, it results a non-optimal compression of the light pulses and thus a reduction of the usable pulse peak performance.

The dispersion of the majority of optical elements, e.g. optics, optical fibers, fiber amplifiers, etc. in the visible and near-infrared spectral range is normal. In case of light pulses temporally stretched with sufficient strength, the effect of dispersion and self-phase modulation can be contemplated separately of each other. With a positive nonlinear refractive index, which represents the normal case, the nonlinearly impressed performance-dependent phase of the self-phase modulation corresponds to an abnormal dispersion. Thus, a compensation of the dispersion of most of the optical elements can be accomplished within the device by setting an appropriate working point of the system with regard to pulse duration and pulse amplitude.

In the special case in which the dispersion values of the stretcher and compressor are identical in amount, the equation hereinabove is solved by the following mathematical approach:

$$\varphi''_{stretcher} = -\varphi''_{compressor}$$

$$\varphi_{SPM} = -\frac{\varphi''_{amplifier\ elements}}{2}\Omega^2$$

Here it is assumed that the stretcher and the compressor are dispersive elements with essentially oppositely identical dispersion and that the corresponding phase terms consequently cancel out each other. The second equation implies that the spectral phase caused by the amplifier elements can be compensated for by the performance-dependent nonlinear phase of the self-phase modulation so that an adaptation of the device to the amplifier applied in a given case can be accomplished in a simple manner and very effectively by way of a suitable setting of the self-phase modulation.

In a CPA system, the following is furthermore applicable:

$$\varphi_{SPM} = B \cdot f(\Omega) = B \cdot \left(1 + f' \cdot \Omega + \frac{f''}{2}\Omega^2 + \ldots\right)$$

Here, B is the so-called B-integral representing the nonlinear phase accumulated in the amplifier system. f represents the line shape function of the spectrum (standardized) and f' represents its first derivation. An exact compensation of the dispersion of the 2nd order of magnitude, for example, is to to be expected with a parabolic light pulse shape, but also with other light pulse shapes, for example with a $sech^2$-shape or Gaussian shape, a major part of the phases impressed by the optical elements is compensated for. For the special case of applying parabolic light pulses and/or for a parabolic approximation of the spectral shape of light pulses, the following is applicable:

$$f(\Omega) = 1 - \Omega^2 \cdot \left(\frac{\sqrt{2}}{\Delta\Omega_{FWHM}}\right)^2$$

with $\Delta\Omega_{FWHM}$ representing the spectral full width at half maximum (FWHM). Following a few transformations, it results the condition of the compensation of the phase terms of the amplifier elements by the nonlinear performance-dependent phase of the self-phase modulation to $$B \cdot \frac{2}{(\Delta\Omega_{FWHM})^2}\Omega^2 = \frac{\varphi''_{amplifier\ elements}}{2}\cdot\Omega^2 = \frac{\beta^{(2)}\cdot L}{2}\Omega^2$$

Here, $\beta^{(2)}$ is the group velocity dispersion (GVD) parameter and L represents the length of the amplifier elements. For a central wavelength of the light pulses of e.g. 1030 nm and assuming that the amplifier elements are made of quartz glass ($\beta^{(2)}$=0.025 $ps^2$/m), FIG. 2 shows the correlation of length L of the amplifier elements with the pulse duration δ at various B-integrals for an optimal compensation of the phase terms with identically configured static elements for pulse stretching and pulse compression. Valid for the curve shown at left in FIG. 2 is B=20 rad, for the mean curve it is B=10 rad, and for the curve at right it is B=5 rad.

Figure 3:
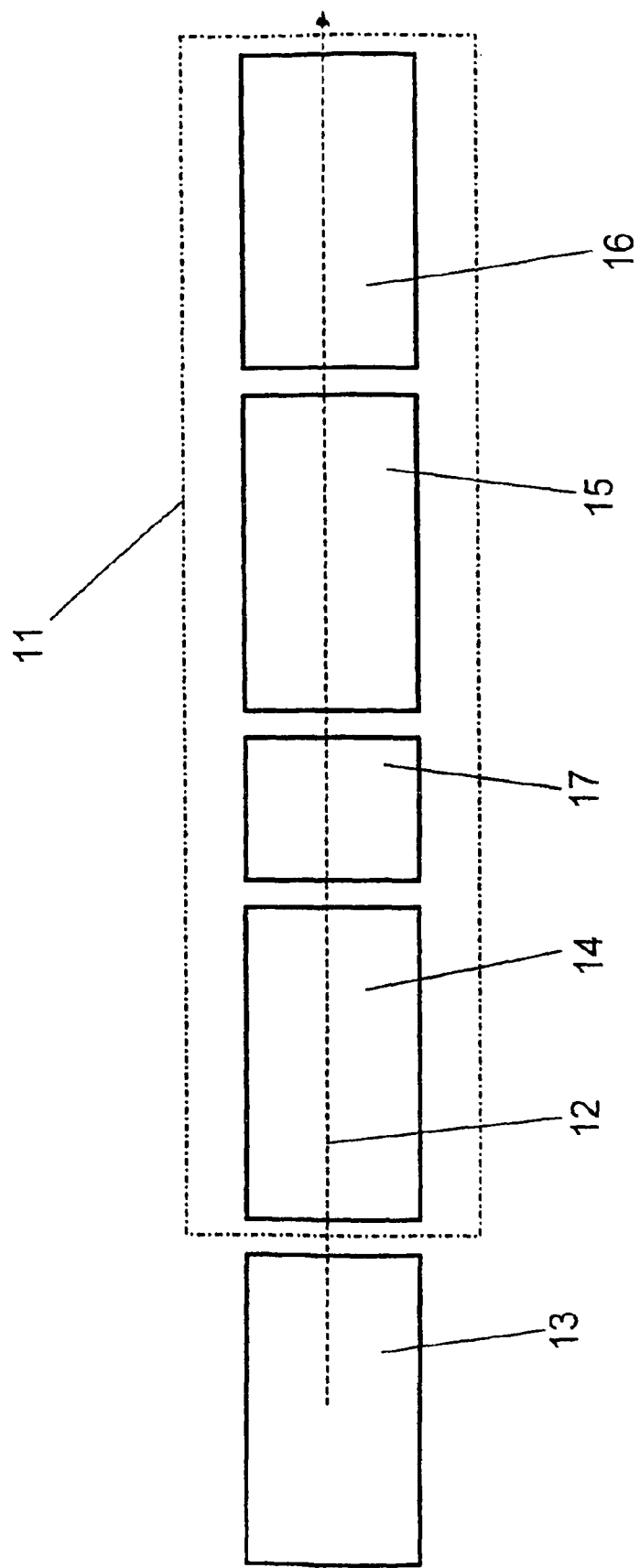

FIG. 3 shows a schematic representation of another embodiment example for the inventive device 11. In this embodiment, too, light pulses 12 are amplified by means of the device 11 by a short pulse oscillator 12, the light pulses 12 initially being stretched temporally by means of stretcher 14, and subsequently the is stretched light pulses 12 are amplified by the at least one amplifier 15 or by several amplifiers 15 and finally the stretched and amplified light pulses 12 are recompressed by means of compressor 16. With the embodiment according to FIG. 3, an additional element 17 of variable dispersion is preferably though not obligatorily arranged between stretcher 14 and amplifier 15 so that by means of this element 17 alone or in combination with a self-phase modulation of light pulses 12, a compensation of the dispersion of amplifier 15, of the dispersion of other not shown optical elements of the device 11 and/or of a mismatch of the dispersion of stretcher 14 and compressor 16 can be accomplished.

The alternative configurations relative to FIG. 1 concerning the use of elements in reflection as stretcher 14 and/or compressor 16, an amplifier chain and/or a single element as stretcher 14 and compressor 16 are also applicable in relation to FIG. 3.

The practical examples described based on these figures serve for explanatory purposes and are non-restrictive.

The invention claimed is:

1. Device (1, 11) for amplifying light pulses (2, 12), said device comprised of a stretcher (4, 14) which temporally stretches the light pulses (2, 12), and comprised of at least one amplifier (5, 15) which amplifies the stretched light pulses (2, 12), and comprised of a compressor (6, 16) which recompresses the stretched and amplified light pulses (2, 12), said stretcher (4, 14) and said compressor (6, 16) being dispersive elements with essentially oppositely identical dispersion, wherein the dispersion of the amplifier (5, 15), the dispersion of further optical elements of the device (1) and/or a mismatch of dispersion of the stretcher (4, 14) and the compressor (6, 16) are at least partly compensated by at least one additional element (17) of variable dispersion.

2. Device (1, 11) according to claim 1, wherein the dispersive elements of the stretcher (4, 14) and/or compressor (6, 16) have a static or a gradually variable dispersion, wherein the at least one additional element (17) of variable dispersion has an infinitely variable dispersion.

3. Device (1, 11) according to claim 1, wherein the dispersive elements of the stretcher (4, 14) and/or compressor (6, 16) are diffraction gratings, chirped fiber-optical or volume-optical Bragg gratings, prisms or waveguide structures such as optical fibers.

4. Device (1, 11) according to claim 1, wherein the at least one additional element (17) of variable dispersion comprises an adjustable prism pair or diffracting grating pair or an acousto-optical element or a liquid crystal element.

5. Device (1, 11) according to claim 1, wherein the dispersion of the at least one additional element (17) of variable dispersion is smaller in amount than the dispersion of the stretcher (4, 14) or of the compressor (6, 16).

6. Device (1, 11) according to claim 1, wherein the light pulses (2, 12) have a parabolic pulse shape, a $sech^2$-shape or a Gaussian shape.

7. Device (1, 11) according to claim 1, wherein the at least one additional element (17) of variable dispersion is arranged upstream to the stretcher (4, 14) or between the stretcher (4, 14) and the amplifier (5, 15).

8. Device (1, 11) according to claim 1, wherein the energy and the duration of the light pulses (2, 12) as well as the amplification of the light pulses (2, 12) are so tuned to each other that the dispersion of the amplifier (5, 15), the dispersion of the further optical elements of the device (1, 11) and/or a mismatch of the dispersion of the7 stretcher (4, 14) and compressor (6, 16) are essentially completely compensated for by self-phase modulation of the light pulses (2, 12).

9. Method for amplifying light pulses (2, 12) by using a suitable device (1, 11), wherein
the light pulses (2, 12) are temporally stretched via a stretcher (4, 14),
the stretched light pulses (2, 12) are amplified via at least one amplifier (5, 15), and
the stretched and amplified light pulses (2, 12) are recompressed via a compressor (6, 16), with the stretcher (4, 14) and the compressor (6, 16) being dispersive elements with essentially oppositely identical dispersion,
wherein the dispersion of the amplifier (5, 15), the dispersion of further optical elements of the device (1, 11) and/or a mismatch of dispersion of the stretcher (4, 14) and the compressor (6, 16) are at least partly compensated by at least one additional element (17) of variable dispersion.

10. Device (1, 11) according to claim 1, wherein the dispersion of the amplifier (5, 15), the dispersion of further optical elements of the device (1) and/or a mismatch of dispersion of the stretcher (4, 14) and the compressor (6, 16) are further compensated at least partly by self phase modulation of the light pulses (2, 12).

11. Method according to claim 9, wherein the dispersion of the amplifier (5, 15), the dispersion of further optical elements of the device (1, 11) and/or a mismatch of dispersion of the stretcher (4, 14) and the compressor (6, 16) are further compensated at least partly by self phase modulation of the light pulses (2, 12).

* * * * *

UNITED STATES PATENT AND TRADEMARK OFFICE
CERTIFICATE OF CORRECTION

PATENT NO.        : 8,659,821 B2
APPLICATION NO.   : 12/998040
DATED             : February 25, 2014
INVENTOR(S)       : Schimpf et al.

It is certified that error appears in the above-identified patent and that said Letters Patent is hereby corrected as shown below:

In the Claims

In Column 8, line 15 (line 6 of Claim 8) please change "the7" to correctly read: --the--.

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,659,821 B2                                    Page 1 of 1
APPLICATION NO.   : 12/998040
DATED             : February 25, 2014
INVENTOR(S)       : Schimpf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Twenty-ninth Day of September, 2015

Michelle K. Lee
*Director of the United States Patent and Trademark Office*